April 12, 1949.

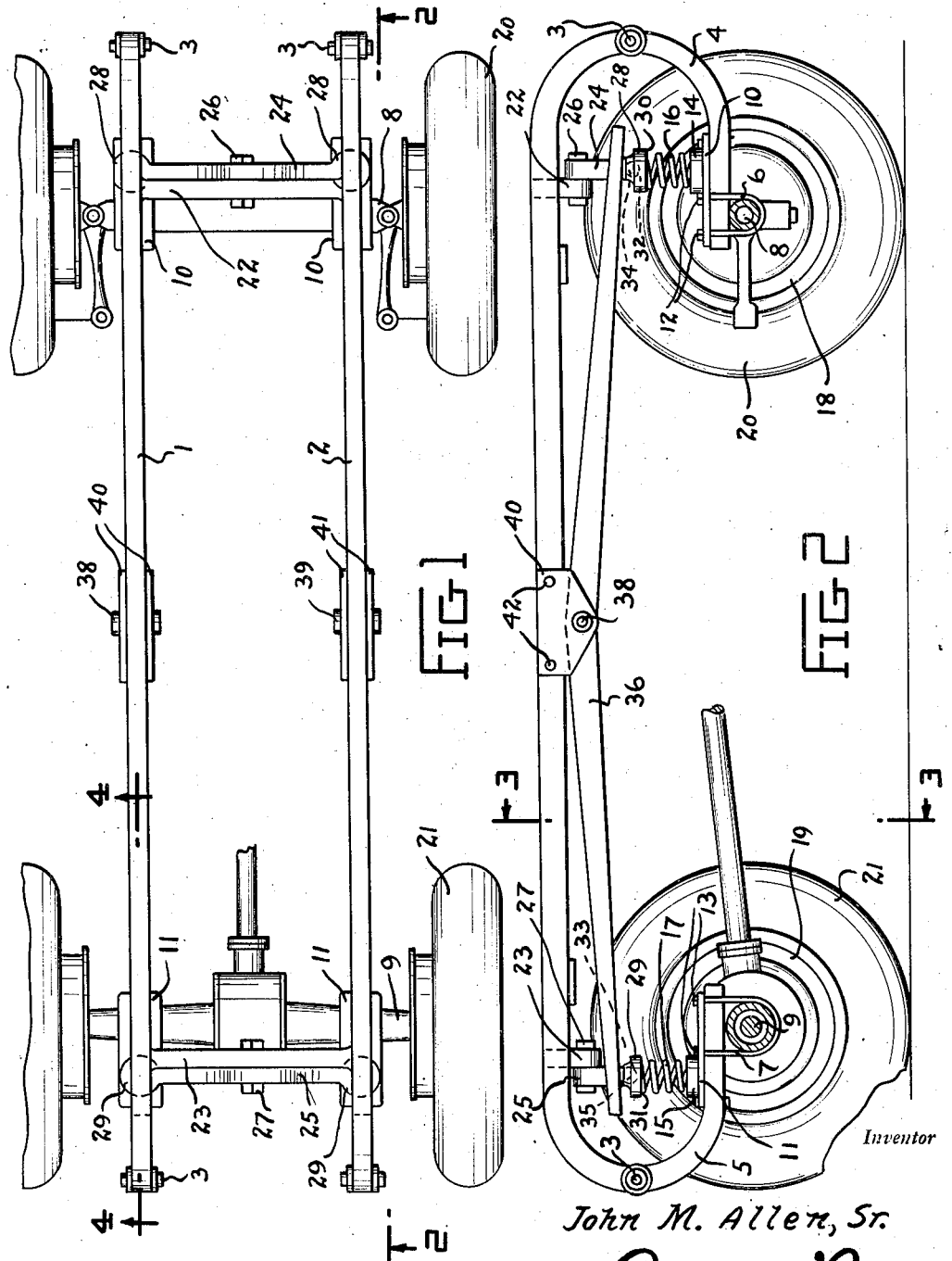

J. M. ALLEN, SR
EQUALIZER SPRING EQUIPMENT
FOR AUTOMOTIVE VEHICLES 2,466,833

Filed Sept. 23, 1946

Inventor

John M. Allen, Sr.

By Clarence A. O'Brien
and Harvey B. Jacobson
Attorneys

Patented Apr. 12, 1949

2,466,833

UNITED STATES PATENT OFFICE 2,466,833

EQUALIZER SPRING EQUIPMENT FOR AUTOMOTIVE VEHICLES

John M. Allen, Sr., Mart, Tex.

Application September 23, 1946, Serial No. 698,824

6 Claims. (Cl. 280—104)

This invention relates to improvements in equalizing spring equipment for automotive vehicles.

An object of the invention is to provide an improved equalizing spring suspension arrangement for automotive vehicles which will provide transversely extending pivoted equalizer bars mounted on front and rear cross connecting members supported between the vehicle chassis frame members, together with arcuate axle supporting arms pivoted to the opposite ends of said chassis frame members, and coil springs disposed between the ends of said equalizer bars and said axle supporting arms.

Another object of the invention is to provide an improved equalizing spring suspension arrangement for automotive vehicles including transversely extending and longitudinally extending equalizer bars pivotally supported to the vehicle chassis frame members, together with arcuate forwardly and rearwardly extending axle supporting arms pivotally connected to the ends of the chassis frame members, and coil springs connected between the adjacent ends of said transverse and longitudinally extending equalizer arms and said arcuate pivotally mounted axle supporting arms.

Another object of the invention is to provide an improved equalizing spring suspension arrangement for automotive vehicles which will be highly efficient in operation, and relatively inexpensive to manufacture and produce.

Other objects will appear as the description proceeds.

In the accompanying drawings which form a part of this application,

Figure 1 is a plan view of a vehicle chassis showing the improved equalizing spring suspension arrangement incorporated therein;

Figure 2 is a view taken on the line 2—2 of Figure 1;

Like characters of reference are used throughout the following specification and the accompanying drawings to designate corresponding parts.

Figure 3:
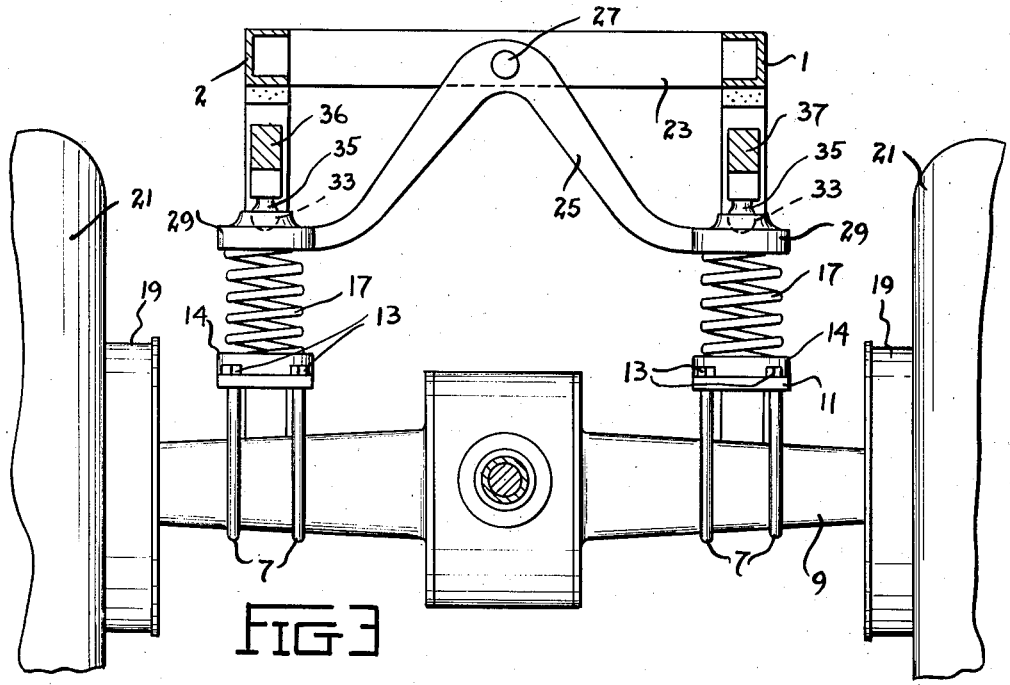
Figure 3 is a view taken on the line 3—3 of Figure 2.
Figure 4:
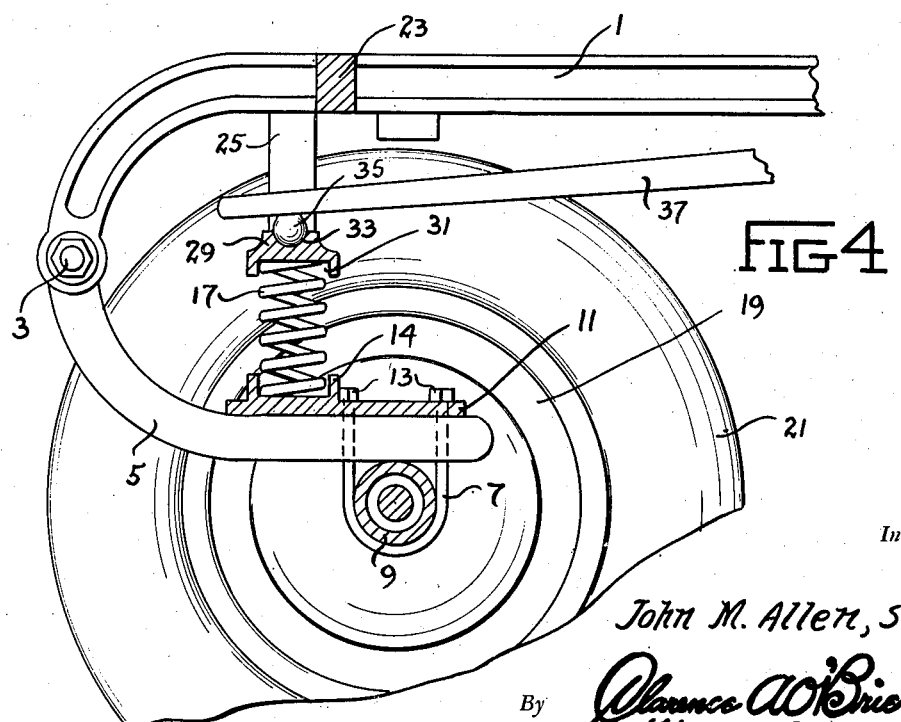
Figure 4 is a sectional view taken on the line 4—4 of Figure 1.

In carrying out the invention, there is provided a vehicle having longitudinally extending spaced parallel frame members 1 and 2, which are downwardly curved at their opposite ends to support the pivot pins or bolts 3 upon which the arcuate inwardly extending axle supporting arms 4 and 5 are pivotally mounted at the front and rear of the chassis frame members respectively.

The U bolts 6 and 7 are adapted to underlie the front axle 8 and the rear axle or differential housing 9 respectively, and support the plates 10 and 11, being held in position by means of the nuts 12 and 13 on the U bolts 6 and 7.

Upstanding cups or flanges 14 and 15 are integrally formed on the upper surfaces of the plates 10 and 11, and are adapted to support the lower ends of the heavy coil equalizer springs 16 and 17. Wheels 18 and 19 with tires 20 and 21 will be disposed on the ends of the front and rear axles 8 and 9.

Cross connecting frame members 22 and 23 are positioned between the chassis side frame members 1 and 2 adjacent the front and rear ends thereof.

The inverted U-shaped yoke members or cross equalizer bars 24 and 25 are pivotally supported upon the bolts 26 and 27 centrally of the cross frame members 22 and 23, and are formed with the oppositely extending chairs 28 and 29 which are hollowed out in their lower sides to form the inverted flanged cups or sockets 30 and 31 for receiving and supporting the upper ends of said heavy coil equalizer springs 16 and 17. The upper surfaces of said chairs 28 and 29 are recessed to form the round sockets 32 and 33 for receiving and supporting the ball heads 34 and 35 depending below the lower surfaces of the opposite ends of the longitudinally extending oppositely inclined and tapered equalizer bars 36 and 37 which are pivotally mounted on the bolts 38 and 39 between the spaced bracket plates 40 and 41 secured to the outer surfaces of said chassis frame members 1 and 2 by means of the bolts 42.

From the foregoing description, it will be apparent that a highly efficient arrangement of equalizer bars and springs will have been provided which will effectively equalize shocks and impacts received by a vehicle thus equipped when traveling over rough terrain or roads.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. In combination with a vehicle chassis having longitudinally extending spaced side frame members, connecting frame members adjacent the opposite ends thereof, arcuate axle supporting arms pivoted to the ends of said side frame members to underlie the same, axles supported by said arms, wheels on said axles, transversely extending equalizer bars pivoted to said connecting frame members, longitudinally extending equalizer arms pivotally supported on said side chassis frame members, and equalizing springs disposed between the adjacent ends of said equalizer bars and said arcuate axle supporting arms.

2. The subject matter as claimed in claim 1, chairs supported on said arcuate axle supporting arms by axle engaging U bolts, and said coil springs being seated at their lower ends in said chairs.

3. The subject matter as claimed in claim 1, chairs supported on the arcuate axle supporting arms by axle engaging U bolts, chairs connected between the outer adjacent ends of said transverse and longitudinal equalizer bars and said coil equalizing springs being disposed between the chairs on the axle supporting arms and said last mentioned chairs.

4. In combination with a vehicle chassis having longitudinally extending spaced side frame members, connecting frame members adjacent the opposite ends thereof, arcuate axle supporting arms pivoted to the ends of said side frame members to underlie the same, axles supported by said arms, wheels on said axles, transversely extending equalizer bars pivoted to said connecting frame members, longitudinally extending equalizer arms pivotally supported on said side chassis frame members, ball heads on the lower surfaces of the outer ends of said longitudinal equalizer arms, chairs supported on said arcuate axle supporting arms by axle engaging U bolts, chairs connected at the outer ends of said transversely extending equalizer bars, coil equalizing springs between said first mentioned and last mentioned chairs, and sockets formed in said last mentioned chairs adapted to receive and support the ball heads on the ends of said longitudinally extending equalizer bars.

5. In combination with a vehicle chassis having longitudinally extending spaced side frame members, connecting members adjacent the opposite ends thereof, axle supporting arms pivoted to the ends of said side frame members, transversely extending equalizer bars pivoted to said connecting frame members, longitudinally extending equalizer arms pivotally supported on said side chassis frame members, resilient biasing means disposed between the adjacent ends of said equalizer bars and said axle supporting arms.

6. The combination of claim 5 and said resilient biasing means comprising a plurality of springs.

JOHN M. ALLEN, Sr.

REFERENCES CITED

The following references are of record in the file of this patent:

UNITED STATES PATENTS

| Number | Name | Date |
| --- | --- | --- |
| 820,707 | Downer | May 15, 1906 |
| 865,505 | Lewis | Sept. 10, 1907 |
| 1,089,257 | Park | Mar. 3, 1914 |